United States Patent [19]

Ward et al.

[11] Patent Number: 4,567,635

[45] Date of Patent: Feb. 4, 1986

[54] COTTER-PIN EXTRACTING PLIERS

[76] Inventors: Dennis M. Ward; Margaret C. Ward, both of 114 Pritchard St., Elizabeth City, N.C. 27909

[21] Appl. No.: 647,164

[22] Filed: Sep. 4, 1984

[51] Int. Cl.[4] ............ B23P 19/04

[52] U.S. Cl. ............ 29/248; 81/302

[58] Field of Search ............ 81/302; 29/248

[56] References Cited

U.S. PATENT DOCUMENTS

| | | | |
|---|---|---|---|
| D. 58,453 | 7/1921 | Anderson | 29/248 UX |
| 1,258,674 | 3/1918 | Hampell | 29/248 |
| 1,468,252 | 9/1923 | Anderson | 29/248 |
| 1,476,695 | 12/1923 | De Graff | 29/248 |
| 1,608,327 | 11/1926 | Lemmon | 29/248 |
| 1,701,052 | 2/1929 | Osborne | 29/248 |
| 2,220,317 | 11/1940 | Cynoske | 29/248 |

*Primary Examiner*—James G. Smith

[57] ABSTRACT

The invention to which this specification pertains represents a new design in cotter-pin extracting pliers, in that the toothed end of this invention is recessed down into the forked end, and the toothed end and forked end are flush with each other, the combination of which characteristics facilitate removal of deeply set pins from shafts and nuts. Another improvement is found in the fact that the pin to be removed is surrounded by the forked end of this invention to prevent slippage. We believe that the extended and upwardly curved upper jaw, unique to our invention, will make possible a tool which will better perform the job of extracting cotter-pins; at the same time, the compact design and the placement of the pivot point make possible a tool requiring a very small amount of space in which to perate, because compression of the handles is the only movement required.

1 Claim, 4 Drawing Figures

COTTER-PIN EXTRACTING PLIERS

BACKGROUND OF THE INVENTION

This invention pertains to the field of tools, specifically, pliers and extractors of cotter-pins.

Prior art known to the applicant is represented by the seven patents for various extractors set forth below:

| Document No. | Date | Name | Class | Subclass |
|---|---|---|---|---|
| (a) D,e58453 | 7/1921 | Anderson | 29 | 248 ux |
| (b) 1,258,674 | 3/1918 | Hampell | 29 | 248 |
| (c) 1,468,252 | 9/1923 | Anderson | 29 | 248 |
| (d) 1,476,695 | 12/1923 | De Graff | 29 | 248 |
| (e) 1,608,327 | 11/1926 | Lemon | 29 | 248 |
| (f) 1,701,052 | 2/1929 | Osborne | 29 | 248 |
| (g) 2,220,317 | ·11/1940 | Cynoske | 29 | 248 |

(a), (b) and (c) are cotter-pin pullers or pliers which are designed to extract cotter-pins, each of which utilize a bottom lever which rests against the cotter-pin as opposed to surrounding it with a forked jaw.

(d) is a cotter-pin puller utilizing a forked jaw in combination with a toothed jaw, which work at a right angle to the handles.

(e) is a device designed to extract cotter-pins and nails by means of two upper jaws which grasp the head of the cotter-pin or the nail (as opposed to protruding through the head of the cotter-pin), while the forked bottom jaw holds the nail or cotter-pin.

(f) is a cotter-pin extractor composed of a two jaw in combination with a forked jaw; with the toothed jaw and forked jaw holding the head of the cotter-pin, this device is designed to extract the same by rotating the entire tool.

(g) is a cotter-pin removing tool consisting of a toothed jaw which is designed to extend through the head of the cotter-pin and hold it in combination with a gapped lower jaw; extraction is then accomplished by means of rotation of the entire tool.

SUMMARY

The invention described herein, for which application for a patent is being made, is a two-piece device consisting of a handle and toothed jaw, mounted in the center of a handle and forked jaw. The bottom, or forked jaw is designed to surround and tightly hold the cotter-pin to be extracted, while the upper jaw protrudes through the head of the cotter-pin, and provide for easy extraction of the cotter-pin by means of closing of the handles.

This invention is distinguished from all of the aforementioned prior inventions in that the pointed end is recessed down into the forked end, and the forked end and pointed end are flush with each other; the combination of these characteristics facilitate the removal of deeply set pins from shafts and nuts. Another distinguishing characteristic peculiar to the subject invention is that the forked end surrounds the pin being removed in order to prevent slippage; with prior inventions, the pliers or pin removers rest against the front of the pin, rather than surrounding it.

In addition to the foregoing, the following distinctions are noted between prior inventions and the device for which application is being made. This invention is different from prior inventions designated as (a), (b) and (c) above, in that it utilizes a lower jaw which is forked and which surrounds the cotter-pin to be extracted. This invention differs from the prior invention designated above as (d), the De Graff device in that there is no 90 degree turn between the handles and the jaws of the tool; it would thus be utilized in different applications and in tight spaces where the configuration of the De Graff cotter-pin puller could not be used because of constricted space. This invention differs from (e) designated above, the Lemon nail and cotter-pin extractor, in that it utilizes an upper jaw which protrudes through the head of the cotter-pin, rather than simply grasping the sides of the cotter-pin head; in addition, this invention is more streamline and requires less operating space than the Lemon device. Finally, this invention differs from (f) and (g) above, the Osborne and Cynoske pullers, in that extraction is accomplished simply by compression of the handles, whereas with the Osborne and Cynoske devices, the entire tool must be rotated in order to accomplish the extraction; this invention could therefore be used in tighter spaces than the Osborne and Cynoske tools. The longer forked jaw with an enhanced upward curve will facilitate extraction of cotter-pins, and will have an advantage over any of the above referenced inventions.

DESCRIPTION OF THE DRAWINGS

This invention is illustrated by the drawings, consisting of four figures, said drawings being attached hereto. In the drawings.

Figure 1:
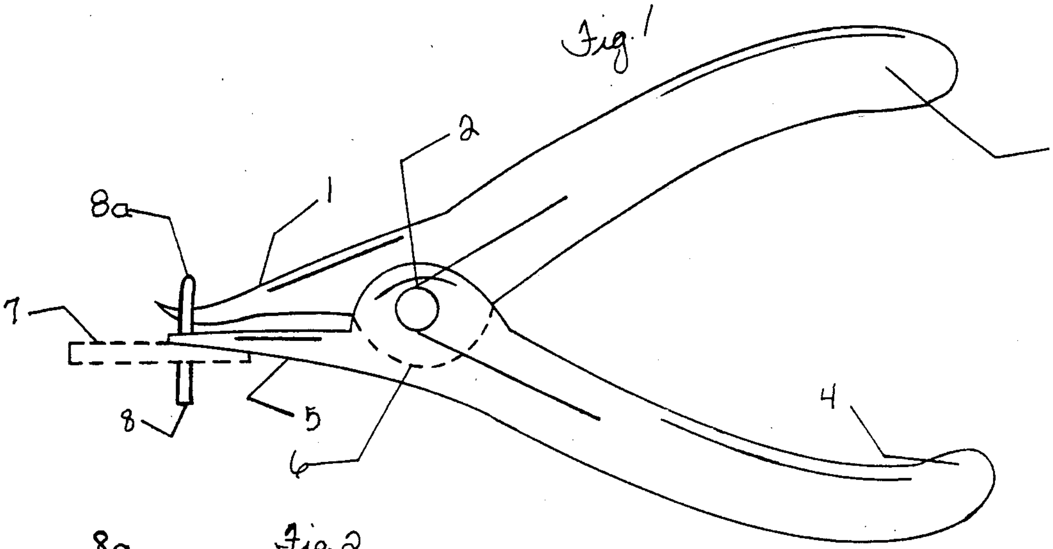
FIG. 1 is a side elevation of a tool constructed in accordance with a preferred embodiment of the invention, showing it in the position of initial application to a cotter-pin for removing the latter from its support.

Referring more particularly to the drawing to which like reference characters throughout the several views refer to the same part, 1 and 5 designate a pair of jaws provided with handle portions 3 and 4, respectively, and held in pivotal relationship by means of a no. 1032 $\frac{3}{4}$ washer screw and nut 2, as usual in plier constructions.

Figure 2:
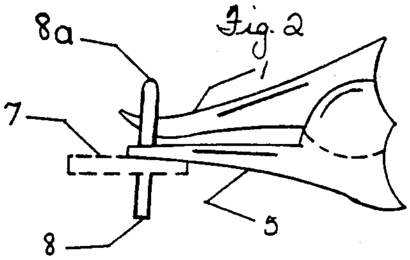
FIG. 2 is a view of the toothed jaw inserted into the head of the cotter-pin and ready to exert upward pressure thereon in conjunction with the forked bottom jaw of the tool.

1 is a tapered or pointed jaw, with an enhanced upward curve, as shown. The eye-engaging portion 1 is adapted to engage or pass through the eye 8*a* of a cotter-pin that is illustrated as secured to a bar or support 7, and includes a body portion 8 with bent ends which normally ends the cotter-pin in place. As the device is operated, the eye-engaging portion 1 passes through the eye 8*a*, as shown in FIG. 1 and FIG. 2, and forceably draws the cotter-pin away from the support 7, at the same time straightening the bent extremities 8, as illustrated in FIG. 3.

Figure 4:
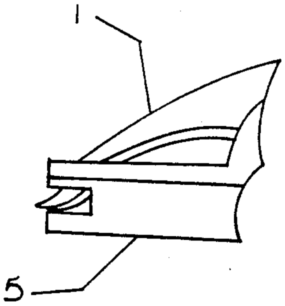
FIG. 4 is a partially transverse view showing the underside of the forked or lower jaw with the upper or toothed jaw protruding through the forked jaw.

To accomplish this, the jaw 5 is flattened at the point where it joins jaw 1. Lower jaw 5 culminates in a flattened forked end as shown in FIG. 4, so as to straddle the body of the cotter-pin to be removed, as shown in FIG. 1.

Figure 3:
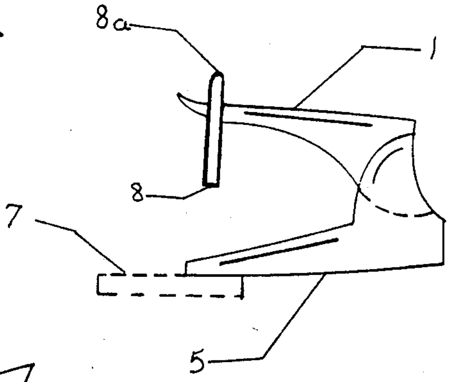
FIG. 3 is a view similar to FIG. 2 showing the position of the toothed and forked jaws and the handles have been compressed and the cotter-pin has been withdrawn from its support.

The opposite ends of the two handles, 3 and 4, respectively, are compressed with the hand against a steel spring 6, to separate toothed end 1 from forked end 5 and effect the removal of the cotter-pin as illustrated by FIG. 3.

The operation of the device is briefly as follows: to remove a cotter-pin, the forked jaw 5 is positioned against the support 7 in the manner illustrated in the FIGS. 1, 2, and 3, with the 2 forks of lower jaw 5 straddling the body of the cotter-pin 8 and located between the eye 8*a* and support 7, with toothed jaw 1 protruding through the eye 8*a*. Thereupon handle 3 and handle 4 are compressed, causing the eye-engaging toothed jaw 1 to lift the cotter-pin 8 from its support 7 and at the same time straightening the bent ends 8 as shown in FIG. 3.

While the invention has been described with reference to the particular construction herein shown, it is not confined to the particular details illustrated, and this application is intended to cover such modifications or departures which may come within the purposes of the invention or the scope of the claim which follows:

We claim:

1. A tool for extracting cotter pins, comprising an upper and lower arm pivotally connected at a point intermediate the ends; said upper arm having an upwardly curved tooth; said lower arm having a forked portion; said tooth being received in said forked portion to facilitate removal of pins which are deeply embedded in shafts or nuts; said forked portion further receiving said pin to surround said pin to prevent slippage.

* * * * *